Patented Apr. 12, 1949

2,467,205

UNITED STATES PATENT OFFICE 2,467,205

PROCESS FOR PRODUCING PIPERAZINE

William F. Gresham and Walter M. Bruner, Wilmington, Del., assignors to E. I. du Pont de Nemours & Company, Wilmington, Del., a corporation of Delaware No Drawing. Application February 25, 1944, Serial No. 523,896

3 Claims. (Cl. 260—268)

This invention relates to heterocyclic amines, and in particular to the synthesis of piperazine by catalytic pyrolysis of ethylene diamine.

It is already known that piperazine may be produced by the action of hydrogenation catalysts on ethylenediamine particularly in the liquid phase. The reaction may be written:

$$2H_2NCH_2CH_2NH_2 \rightarrow HN(CH_2CH_2)_2NH + 2NH_3$$

An object of this invention is to provide an improved process for synthesis of piperazine from ethylenediamine. Another object is to provide a process for synthesis of piperazine from ethylenediamine without the use of a hydrogenation type of catalyst. A still further object is to provide a process for preparing piperazine from ethylenediamine in high yield.

These and other objects are accomplished in accordance with this invention by pyrolysis of ethylenediamine in the presence of catalysts of the type generally known as vapor phase dehydration catalysts which in the above reaction act as de-amination catalysts. Among the dehydration catalysts are silica gel, titania gel, alumina, thoria, boron phosphate, aluminum phosphate and the like. One of the preferred catalysts is basic aluminum phosphate.

The catalytic pyrolysis of ethylenediamine in accordance with this invention takes place in the vapor phase at a temperature in the range of about 250° C. to 500° C., preferably 350° to 450° C. The reaction is best conducted at atmospheric pressure, although it is sometimes advantageous to employ diminished pressures or to conduct the pyrolysis in the presence of an inert carrier gas. Such carrier gas may be hydrogen, ammonia, nitrogen, nitrogen-hydrogen mixture, or the like.

This invention is best performed by passing ethylenediamine vapor over a pelleted dehydration catalyst in a converter constructed of noncatalytic material. The resultant mixture of piperazine, unreacted ethylenediamine, and polyethylene polyamines, after leaving the catalyst, is passed through a condenser, and the condensate thus obtained is subjected to fractional distillation. The constituents of the condensate other than piperazine are preferably recycled over the catalyst with make-up ethylenediamine. In this manner, conversions of ethylenediamine to piperazine are generally within the range of 15 to 35% of the theoretical. Since the polyethylene polyamines do not accumulate beyond an equilibrium proportion, the yield of piperazine, based on ethylenediamine consumed, improves with the first few cycles and thereafter remains constant and high.

The optimum space velocity for the pyrolysis of ethylenediamine to piperazine varies with the pyrolysis temperature, and is in general within the range of 100 to 1000. It is preferably about 400 to 800 when the temperature is in the range of 350° to 450° C. The term space velocity is defined as the number of cubic centimeters of gas, measured at normal temperature and pressure, which passes over one cubic centimeter of catalyst in one hour.

The invention is further illustrated by the following example.

*Example.*—Into a vertical Pyrex tube containing 50 c. c. of aluminum phosphate catalyst (pelleted, then crushed and screened to 8–14 mesh), heated at a temperature of 400° to 430° C., was passed ethylenediamine at a space velocity of 750. The effluent vapors were passed through a condenser, and the resulting condensate was collected in a receiver. After the reaction had proceeded for 1.2 hours, the condensate was withdrawn and distilled, yielding 37.0 grams of a fraction containing ethylenediamine (B. P. 71° to 125° C. at atmospheric pressure), 15.0 grams of piperazine (B. P. 110° C. at 65 mm.), and 21 grams of a residual liquid containing polyethylene polyamines.

While in this example the method employed for separation of piperazine from the pyrolyzate is fractional distillation, any other suitable method of separation may be employed, such as fractional crystallization from a suitable solvent, such as methanol or ethanol. It is to be understood that the present invention is not restricted to the specific procedures and catalysts hereinbefore disclosed, but that it extends to all equivalent treatments, and to the pyrolysis of ethylenediamine over solid dehydration type catalysts generally, being limited only as set forth in the following claims.

We claim:

1. In a process for the synthesis of piperazine the steps which comprise heating a substance selected from the group consisting of ethylenediamine and polyethylene polyamines at atmospheric pressure in the presence of aluminum phosphate at a temperature in the range of 350° to 450° C., separating piperazine from the resultant pyrolysate and recovering said piperazine.

2. In a process for the synthesis of piperazine the steps which comprise passing ethylenediamine in the vapor phase at about atmospheric pressure over an aluminum phosphate catalyst at a space velocity in the range of 400 to 800, at a temperature of about 350° to 450° C. separating piperazine from the resultant product and recovering said piperazine.

3. In a process for the synthesis of piperazine the steps which comprise passing ethylenediamine vapor over aluminum phosphate catalyst at about 400° to 430° C. at a space velocity of about 750, condensing the effluent vapors, separating piperazine from the resultant condensate and recovering said piperazine.

WILLIAM F. GRESHAM.
WALTER M. BRUNER.

REFERENCES CITED

The following references are of record in the file of this patent:

UNITED STATES PATENTS

| Number | Name | Date |
|---|---|---|
| 1,845,555 | Pier et al. | Feb. 16, 1932 |
| 2,136,094 | Wilson | Nov. 8, 1938 |
| 2,219,839 | Grosbert | Oct. 29, 1940 |
| 2,267,686 | Kyrides | Dec. 23, 1941 |

OTHER REFERENCES

Sabatier, Catalysis in Organic Chemistry, D. Van Nostrand Co., 1922 ed. pp. 28 and 258.

Sabatier, Reid Catalysis in Organic Chem., page 246 (1923) (Copy in Division 59).

Berkmann, Morrell, Egloff, "Catalysis," Reinhold Publishing Co., New York, 1940, page 863.

Berichte, vol. 23, pages 3723–3726.